US010717529B2

(12) United States Patent
Russo (10) Patent No.: US 10,717,529 B2
(45) Date of Patent: Jul. 21, 2020

(54) UNMANNED AERIAL VEHICLE LIQUID TRANSPORT, METHOD AND SYSTEM USING SAME

(71) Applicant: John M Russo, Carmel Valley, CA (US)

(72) Inventor: John M Russo, Carmel Valley, CA (US)

(73) Assignee: Whole Life Living LLC, Cedar Park, TX (US)

( * ) Notice: Subject to any disclaimer, the term of this patent is extended or adjusted under 35 U.S.C. 154(b) by 195 days.

(21) Appl. No.: 15/797,874

(22) Filed: Oct. 30, 2017

(65) Prior Publication Data

US 2018/0118340 A1    May 3, 2018

Related U.S. Application Data

(60) Provisional application No. 62/414,394, filed on Oct. 28, 2016.

(51) Int. Cl.
| | |
|---|---|
| *B64D 1/16* | (2006.01) |
| *A01K 59/00* | (2006.01) |
| *A01K 53/00* | (2006.01) |
| *B64F 1/32* | (2006.01) |
| *B64C 39/02* | (2006.01) |
| *B64D 1/22* | (2006.01) |

(52) U.S. Cl.
CPC ............ *B64D 1/16* (2013.01); *A01K 53/00* (2013.01); *A01K 59/00* (2013.01); *B64C 39/024* (2013.01); *B64D 1/22* (2013.01); *B64F 1/32* (2013.01); *B64C 2201/024* (2013.01); *B64C 2201/027* (2013.01); *B64C 2201/042* (2013.01); *B64C 2201/066* (2013.01); *B64C 2201/108* (2013.01); *B64C 2201/128* (2013.01)

(58) Field of Classification Search
CPC ........ B64D 1/16; B64D 1/22; B64D 1/00–22; B64C 2201/024; B64C 2201/128; B64C 2201/066; B64C 2201/042; B64C 2201/027; B64C 2201/108; B64C 39/024; A01K 53/00; A01K 59/00; B64F 1/32
See application file for complete search history.

(56) References Cited

U.S. PATENT DOCUMENTS

| | | | |
|---|---|---|---|
| 9,527,605 B1* | 12/2016 | Gentry | ..................... B64F 1/12 |
| 2013/0056230 A1* | 3/2013 | Lemke | ................. A62C 3/0242 169/44 |
| 2014/0127968 A1* | 5/2014 | Probasco | ............... A01K 51/00 449/2 |
| 2016/0376031 A1* | 12/2016 | Michalski | ............. B64C 39/024 701/15 |
| 2017/0035033 A1* | 2/2017 | Adams | .................. A01K 47/02 |

* cited by examiner

*Primary Examiner* — Adam R Mott
(74) *Attorney, Agent, or Firm* — Law Office of Shannon Warren, PLLC (57) ABSTRACT

A method for transporting liquid with a UAV transport that includes docking the UAV transport with a first station and supplying the UAV transport with liquid from the first station. The UAV transport undocks from the first station and flies to the vicinity of a second station. The UAV transport docks with the second station and delivers at least a portion of the liquid to the second station. A UAV for use therewith and a method for maintaining a feed tray at the second station are provided.

16 Claims, 7 Drawing Sheets

UNMANNED AERIAL VEHICLE LIQUID TRANSPORT, METHOD AND SYSTEM USING SAME

CROSS REFERENCE TO RELATED APPLICATION

This application claims priority to U.S. provisional patent application Ser. No. 62/414,394 filed Oct. 28, 2016, the entire content of which is incorporated herein by this reference.

FIELD OF THE INVENTION

The present invention relates to a delivery system and method and, more particularly, to a method and system for delivering liquids to bee hives.

BACKGROUND OF THE INVENTION

The complexity of keeping honeybees is increasing and the economic viability of honeybee cultivation is threatened. The 2014-2015 honeybee report released by the USDA in May of 2015 estimates that 42% of all registered honeybee hives kept in the United States do not survive a year. Sustainable loss rates are predicted in the 15-18% range. The causes of many of these losses are unknown. Hive loss represents a significant factor in the economics of beekeeping in the United States. In light of the foregoing, the honeybee industry, necessary for pollination and honey production, is at significant risk.

While the loss rates dip into the industry accepted range of sustainability, the increase in effort required to achieve these rates is significant. There are two components to the cost increases, increase in labor and increase in material. The distribution of feed and medications for the control of hive disease and nutritional management is a significant resource investment for beekeepers seeking to reduce hive losses.

What may be needed is new systems and methods for the distribution of feed and medications to bee hives. If the foregoing costs could be managed through such a new system and method, it may be possible to reap the promised sustainability from the reduced hive loss numbers.

BRIEF DESCRIPTION OF THE DRAWINGS

The drawings described herein are for illustration purposes only and are not intended to limit the scope of the present disclosure in any way.

DETAILED DESCRIPTION OF THE INVENTION

In any embodiment of the invention, an unmanned aerial vehicle (UAV) can be provided for obtaining and delivering a liquid. In any embodiment of the invention, a UAV and a system can be provided for delivering a liquid from a first or base station to one or a plurality of recipient stations. In any embodiment of the invention, one or more of the recipient stations can be associated with a beehive. In any embodiment of the invention, the liquid can include feed for bees. In any embodiment of the invention, the liquid can include medication for bees, for example medications to treat *nosema, Varroa* or both.

The embodiments of the invention set forth below are examples of the invention, and may in some instances be broader than the foregoing embodiments of the invention but are not intended to limit the breadth of the foregoing embodiment or the breadth of the invention. Additional features of the invention set forth in such embodiments are optional. A feature of any embodiment set forth below can be combined with the foregoing embodiments, with or without any other feature of any embodiment set forth below. All characteristics, steps, parameters and features of any method, process, apparatus, device or system described below are not limited to any specific embodiments, including those set forth below, but instead can be equally applicable to any of the foregoing embodiments of the invention and optionally to any or all embodiments of the invention. Broad terms and descriptors are replaced in some instances with more specific terms and descriptors, not to limit a disclosure to a specific term or descriptor but merely for ease of discussion and understanding.

Any embodiment of the invention can focus on *nosema* control and food supply. Advances in UAV technology including quad rotor or other precision flying systems, global positioning system (GPS) navigation and image processing can be utilized. Any embodiment of the invention can be employed to reduce the costs of cultivation practices with a goal to improve hive health and reduce annual losses.

To reduce the cost of the distribution of feed and medication to a large number of hives, in any embodiment of the invention a system can be provided with a base station, a UAV transport, at least one recipient station and a control system of any suitable type.

Figure 1:
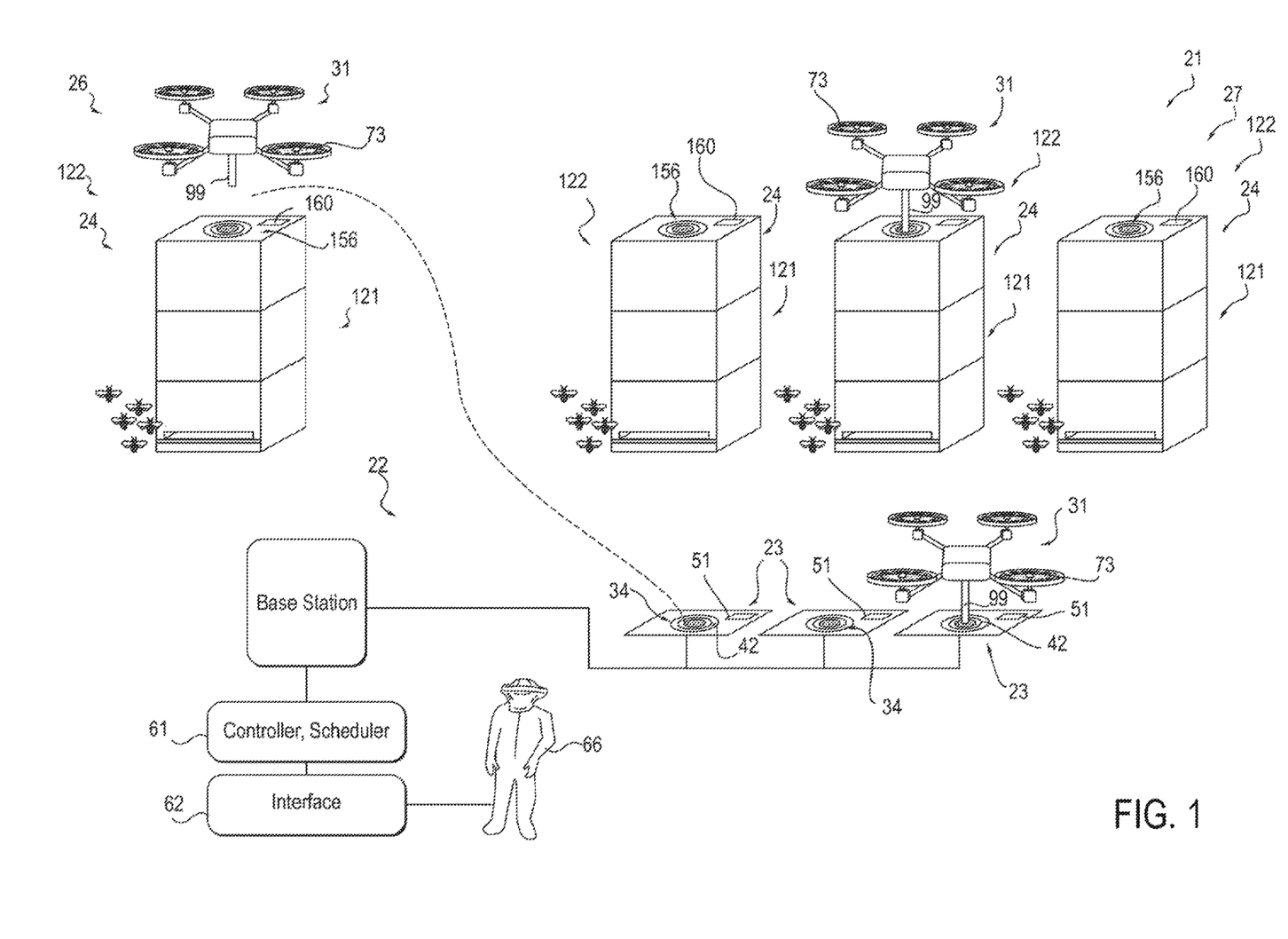
FIG. 1 is a schematic drawing of one embodiment of a system of the present invention.

One embodiment of a system 21 of the invention is illustrated in FIG. 1. System 21 can include any number of base stations 22, each base station including any number of base station docks 23. Each base station can be referred to as a first station. In FIG. 1, for example, system 21 is shown having a single base station 22 having a plurality of base station docks 23, more specifically three base station docks. System 21 can further include any number of hive docks 24, which can be supported by the base station 22. Each hive dock can be referred to as a second station. The hive docks 24 can be in any number of locations. In FIG. 1, for example, system 21 includes a single hive dock 24 located in a first location 26 and a plurality of other hive docks 24, more specifically three other hive docks 24, located in a second location 27 spaced apart from and remote from the first location 26. System 21 can further include any number of unmanned aerial vehicles or UAVs 31 for supplying the one or more hive docks 24 from the base station 22. In any embodiment, each of the UAVs 31 can be paired with a base station dock 23 such that, for example, the number of UAVs 31 equals the number of base station docks 23. In FIG. 1, for example, a UAV 31 is shown having been supplied from one of the base station docks 23 of base station 22 and now hovering over a hive dock 24 at the first location 26, in preparation for docking with such hive dock 24. A second UAV 31 is shown in FIG. 1 docked with one of the hive dock 24 at the second location 27, for example to refill such hive dock 24. A third UAV 31 is shown in FIG. 1 docked at one of the base station docks 23, for example to refill, recharge or perform any other number of functions at the base station 22. It is contemplated that any number of base station docks 23 can support any number of UAVs 31.

Figure 2:
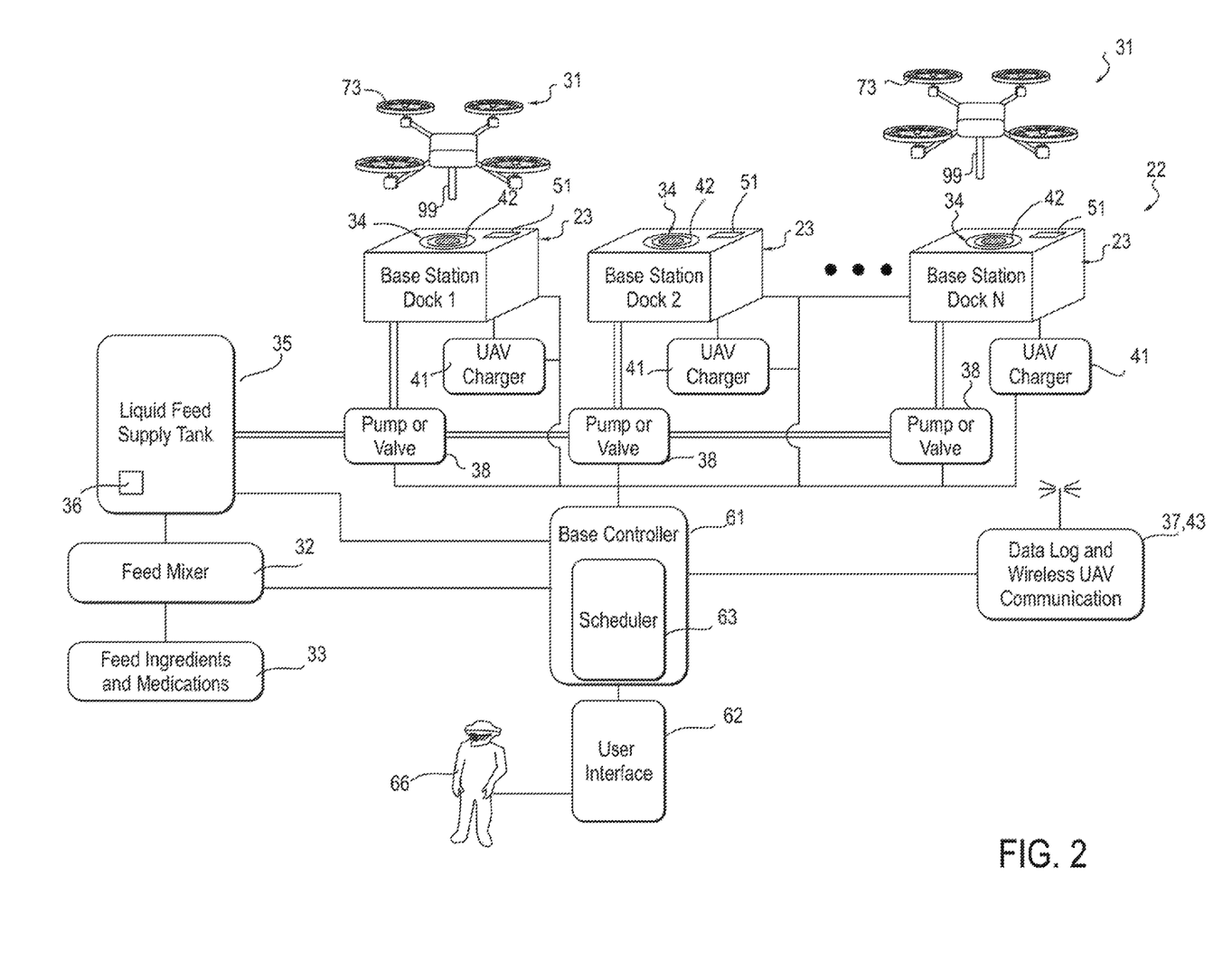
FIG. 2 is a schematic drawing of one embodiment of a base station of the system of FIG. 1.

The base station 22 can be provided for supplying the liquid or other delivered product to a suitable UAV transport 31. In any embodiment, the liquid to be delivered is feed for beehives, medication for beehives or both. Such medications can include medications to treat *nosema, Varroa* or both. For simplicity, in many instances below the liquid will be referred to as feed. In any embodiment, the base station can include a feed mixer 32 that automatically mixes feed from dry ingredients, for example stored in one or more containers or tanks 33 connected to the mixer 32. The feed mixer 32 can additionally add medications to the feed, for example stored in the one or more containers or tanks 33, for example as illustrated in FIG. 2. In any embodiment, the base station 22 is at an apiary site.

The base station 22 can be of any suitable type, for example as shown schematically or simplistically in FIG. 1 or as illustrated in more detail in FIG. 2. In any embodiment, the base station 22 can include a docking receiver 23 for automatically receiving a suitable UAV transport 31. Such docking receiver 23, which can also be referred to as a base station dock, a UAV dock, a UAV receiver or any combination of the foregoing, can be provided at or near the base station 22 to accommodate the receiving of a payload from the base station for supplying one or more UAVs 31. A base station 22 can include any number of docking receivers 23 for simultaneously or sequentially accommodating any number of UAV transports 31. Each docking receiver 23 can be of any suitable type, and include a docking port 34 of any suitable type of removably coupling with a UAV transport 31.

In any embodiment, the base station 22 can includes a suitable reservoir or container 35 for supplying the liquid or other product to a UAV transport 31. One such reservoir or container is a liquid feed supply tank or supply tank, for example illustrated in FIG. 2 and labelled liquid feed supply tank 35. The liquid supply tank 35 can be connected to the mixer 32, for receiving liquid processed by the mixer 32. A sensor 36 can be provided in the base station 22, for example in communication with the reservoir container 35, for monitoring the level or amount of feed in the reservoir or container 35. A data log 37 can also be maintained, at the base station 22 or elsewhere in the system, for recording the amount of feed in the supply tank 35, supply containers 33 or any combination thereof, including as a function of time. The data log 37 can be of any suitable type, for example computer memory or other storage. In any embodiment, a pump, valve or other suitable controlled delivery mechanism 38, or any number thereof, can be provided for supplying liquid from the supply tank 35 of the base station 22 to each docking receiver 23. In any embodiment, a plurality of controlled delivery mechanisms 38, such as pumps, can be provided, for example one such mechanism 38 for each base station dock 23. Mechanism 38 can be coupled between container 35 and docks 23 in any suitable manner, for example sequentially (as shown in FIG. 2), in parallel or any combination the foregoing.

Figure 6:
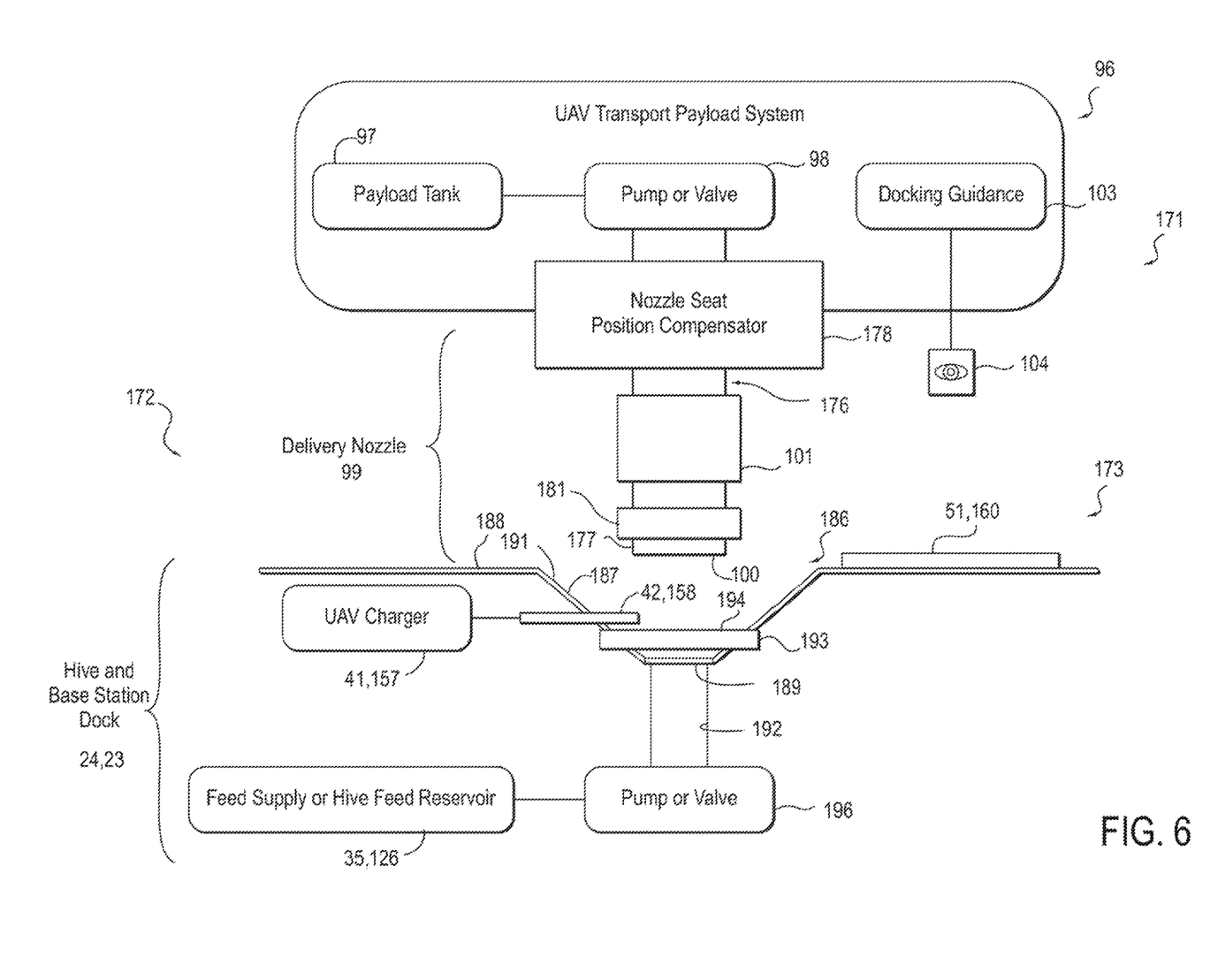
FIG. 6 is a schematic drawing of one embodiment of the docking system of the unmanned aerial vehicle and recipient station of the system of FIG. 1.

Each docking receiver 23 can optionally be provided with a suitable UAV charger 41 for charging of a UAV transport 31, for example by means of any suitable recharge adapter 42, such as shown in FIG. 6, for electrically connecting to a UAV transport 31 for recharge of the battery of the UAV transport while the UAV transport 31 is docked at a docking receiver 23 or otherwise at the base station 22. A charger 41 can be provided for each docking receiver 23, as shown in FIG. 2, or be coupled to and serve a plurality of docking receivers 23. The docking receiver 23 can optionally be provided with a suitable data transfer interface and mechanism 43 for connection with the UAV transport 31. In any embodiment, the data transfer interface and mechanism 43 can be of any suitable wireless type and use any suitable wireless communication protocol. For example, such interface and mechanism can utilize a radio frequency or other module utilizing a serial protocol. In any embodiment, for example in a system of the invention having multiple base station docks 23, a Bluetooth or other wireless technology that supports multiple simultaneous connections can be utilized by the data transfer interface and mechanism 43. For simplicity, data log 37 and wireless communication mechanism 43 are shown together in FIG. 2. In any embodiment, a wired connection between the UAV transport and the docking receiver can be provided for data transfer, for example by cooperatively engaging hardware adapters between the UAV transport and the base station dock (not shown). In any embodiment, the hard wire adapter of the UAV transport can be carried by the nozzle of the UAV transport (not shown). Such wired connection can utilize a serial or any other suitable transmission protocol.

In any embodiment, each docking receiver 23 can be provided with suitable guidance aids 51 for facilitating the docking of a UAV transport 31 with the docking receiver or base station dock 23. For example, in any embodiment each docking receiver 23 can include visual markings 51 to facilitate UAV docking guidance and alignment and may contain any suitable visual QR or scan code to facilitate aerial or field identification of the base station 22, for example by the UAV transport 31, and docking of the UAV transport 31 with the base station 22, for example a docking receiver 23 of the base station.

Each base station 22 can include a controller or be coupled to a controller 61, for example an electronic controller. The controller 61 can automatically control the operations of the base station, for example in any embodiment operate the base station 22 without human intervention. In this regard, the controller 22 can be electrically connected to each docking receiver 23, each pump or other controlled delivery mechanism 38 of the base station, each UAV charger 41 of the base station, the feed mixer 32, the liquid supply tank 35, sensor 36 of the liquid supply tank or container, data log 37, data transfer interface and mechanism 43 or any combination of the foregoing. The electronic controller 61 can be of any suitable type, for example a computer having a microprocessor, memory or other suitable storage and a user interface 62. A battery (not shown) can be provided for providing power to the controller 61, or the controller can be powered by any other suitable means. The controller 61 can be programmed, for example with firmware, software or both, to control the functions of the base station 22, including maintenance of appropriate levels of feed in the supply tank 23, activation of dock pumps or valves 38 during refilling, turning on and off UAV chargers 41 and facilitating docking of a UAV transport 31 with the docking receiver 23. In any embodiment, the controller 61 can be located remote of the base station 22 and any or all of the other components of the system 21 or may be located in part with base station 22 and in part remotely. In any embodiment, the controller 61 can be located partially or totally in the cloud.

In any embodiment, the controller 61 can serve as or include a scheduler 63, for example to manage distribution of the liquid or other supplied product to one or more UAV transports 31. The scheduler 63 can include a scheduling system to keep track of the status of each hive and the distribution plan for each hive. When distribution of either feed or medication is required, the scheduler can initiate on-demand mixing of payload with custom formulation, for example at feed mixer 32 or elsewhere at the base station 22, and begin instructing or assigning one or more UAV transports 31 to deliver payload to required destinations. In any embodiment, such assignment can be accomplished during docking of a UAV transport 31 with the base station 22. In any embodiment, assignments or other information are relayed to a UAV transport 31 wirelessly during flight of the transport. The controller and scheduler 61 can be programmed to receive information from the beekeeper, user or operator 66 such as feed formulas, dates and quantities and target hives. In any embodiment, the controller and scheduler 61 can be remotely controlled. For example, the beekeeper can manage the entire system 21 through the scheduler 63 remotely across the Internet.

The user interface 62 of the controller 61, which can be electrically or wirelessly connected to the controller, can be of any suitable type. In any embodiment, the beekeeper, user or other operator 66 can utilize the user interface 62 to specify feeding schedule information. The interface 62 can include a traditional computer GUI, a web based application, a mobile or smartphone application or any combination of the foregoing. In any embodiment, the interface 62 can be used to monitor completed deliveries, deliveries in progress or both and to review log information such as UAV events and reported feed levels from individual hives before delivery.

The base station 22 can include a suitable wireless transmitter and receiver, for example for communicating with the one or more UAV transports, one or more hive docks 24 or any combination of the foregoing. The wireless transmitter and receiver can include data transfer interface and mechanism 43 and be electrically connected to the controller 61 by any suitable means. In any embodiment, the controller receives information from the hive docks 24 of the system 21, including the amount of feed at each hive dock 24, and coordinates the formation of sufficient feed in the supply tank 35 and delivery by one or more UAV transports 31 to replenish feed at hive docks 24 requiring the same. The received, or collected, information can be transmitted periodically, continuously or when required by the base station 22 or hive dock 24.

In any embodiment, distribution of feed from the base station 22 to individual hives can be accomplished through any suitable UAV transport 31. In any embodiment, such transport vehicle 31 can include the UAV vehicle itself and can additionally include a liquid storage tank or feed tank, the ability to dock with the base station 22 to receive a suitable liquid payload, the ability to dock with the base station to electrically recharge the UAV, the ability of the UAV to communicate with a scheduler 62 or scheduling system or any combination of the foregoing. In any embodiment, the UAV 31 can be capable of hovering and has precision navigation control. It can have the ability to navigate independently to a given hive or base station 22. In any embodiment, once it acquires the target destination, for example the base station 22 or a specific hive doc 24, it can be able to automatically dock with the base station 22 or hive dock 24.

Figure 3:
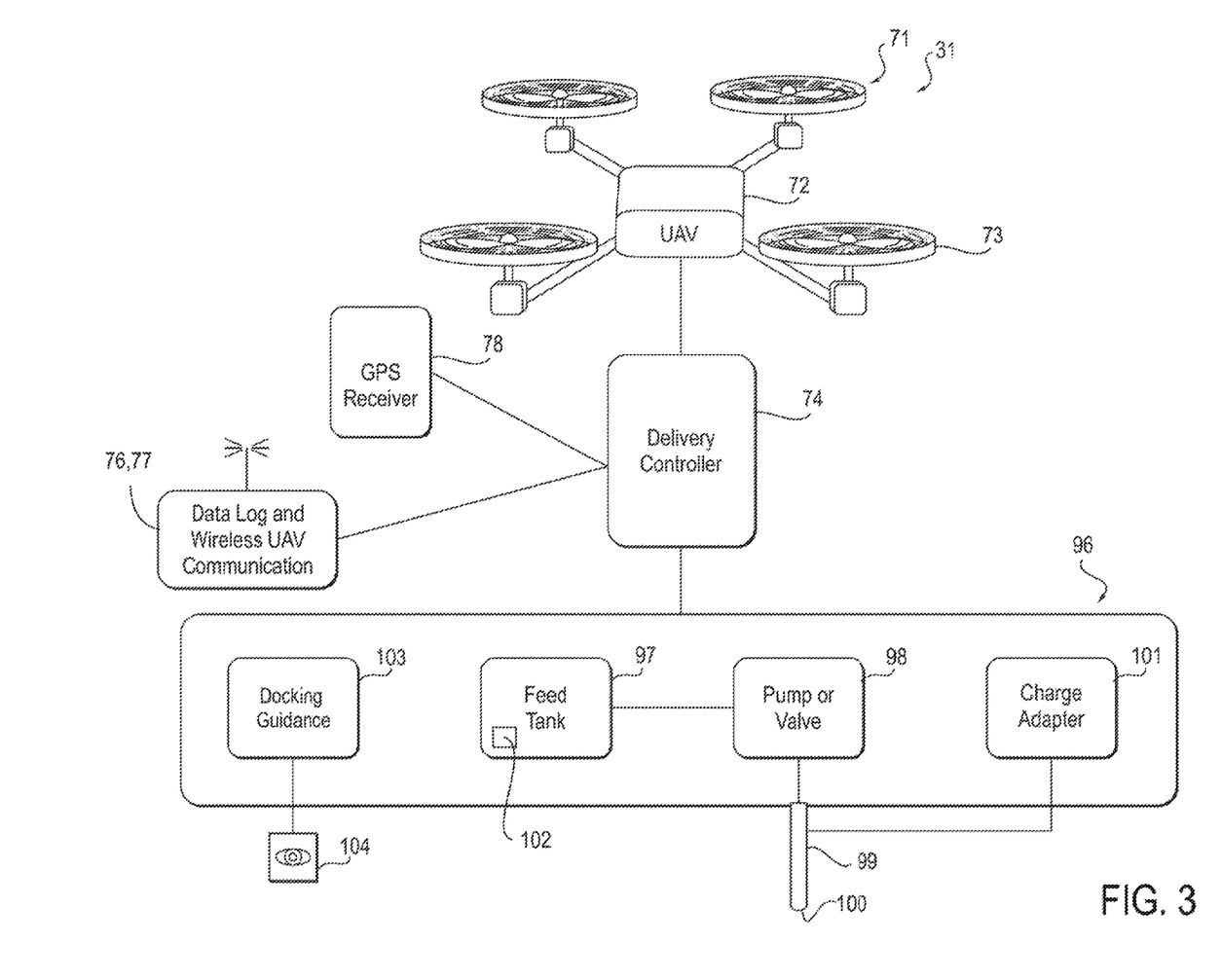
FIG. 3 is a schematic drawing of one embodiment of an unmanned aerial vehicle of the system of FIG. 1.

A schematic illustration of one embodiment of a UAV transport 31 of the invention is shown schematically in FIG. 3. The UAV transport includes the UAV vehicle 71 itself, which can include a body 72, a plurality of rotors 73 for providing lift and steering of the body, one or more motors (not shown) in the body 72 for operating the rotors 73 and a battery (not shown) for providing power to the one or more motors and the other electrical components of the UAV transport. The UAV transport can additionally include a controller 74 of any suitable type carried by or in the body 72. The controller, which can be referred to as a delivery controller, can be of any suitable electronic type, for example a computer having a microprocessor, memory or other suitable storage, a battery and a user interface. The controller can be responsible for managing all aspects of the UAV 31, including lift and directional control, delivery of feed, liquid or other payload, payload loading and unloading, receiving delivery targets from a scheduler 63, navigation to destinations and return to the base station 22, logging of relevant delivery data and events, for example in a data log 76, or any combination of the foregoing. The data log 76 can be of any suitable type, for example computer memory or other storage. The controller 74 can be suitably configured or programmed in this regard, for example by firmware, software or both, and act in accordance with commands delivered thereto by the base station 22 or while at the base station 22. The UAV transport 31 can include a transmitter and receiver 77 for permitting wireless communications with the UAV 31, including the controller 74 of the UAV, and can include GPS capability such as a GPS receiver 78 for providing location data with respect to the UAV 31. For simplicity, data log 76 and wireless transmitter and receiver 77 are shown together in FIG. 3. In any embodiment, the controller 74 of the UAV transport can be programmed or otherwise configured to navigate the UAV transport 31 from the base station 22 to one or more hive docks 24 and back to the base station without human intervention or control during flight. That is, navigation can be entirely automatic. For example, the controller 74 can include automated flight control circuitry, programming or both and can obtain periodic or continuous location data, for example by means of GPS receiver 78 or otherwise, for permitting such automated flight between stations of the system 21 of the invention.

In any embodiment, a payload system or assembly 96 can be provided in the UAV transport 31, for example carried by the body 72 of the UAV. The payload assembly 96 can be of any suitable type, and can include a tank 97 for storing feed obtained from the base station 22 for delivery to a hive. In any embodiment, a pump, valve or other controlled delivery mechanism 98 and a nozzle 99 can be provided and connected to the feed or payload tank 97 for obtaining the feed from the base station, for example through an opening 100 at the end of the nozzle 99, and storing the feed in the tank 97 and for delivering feed from the feed tank to a hive dock 24, for example through the opening 100 at the end of the nozzle 99. The opening 100 in nozzle can be referred to as an exit opening. Such controlled delivery mechanism 98 may eliminate the need for a pump in the base station, the hive dock or both in certain embodiments of the invention. A suitable charge adapter 101 can be provided, for example as part of the payload assembly 96, for enabling any or all batteries of the UAV transport 31 to be charged when the UAV transport is docked at the base station 22, any hive dock 24 or both. In any embodiment, the charge adapter 101 can be mechanically coupled to the feed nozzle 99 to facilitate charging while the UAV transport is obtaining feed from the base station 22 or delivering feed to the hive dock 24. The charge adapter 101 can include electrical contacts accessible at the nozzle for permitting the charging of the battery of UAV transport 31. In any embodiment, the charge adapter of system 21, including charge adapter 101, may use inductive components to implement contact-less coupling. The payload system 96 can optionally include a sensor 102 of any suitable type for monitoring the level of the contents in payload tank 97.

The UAV transport 31 can include a docking guidance mechanism 103 or any suitable type, for example carried by body 72 such as included within the payload assembly or system 96, which can include a visual, image, video or other guidance sensor 104 of any suitable type for facilitating docking of the UAV transport 31 with the base station 22, the hive docks 24 or both. In any embodiment, the docking guidance mechanism 103 can provide information to the delivery and flight control components of the UAV transport to guide the nozzle 99 of the UAV transport into the docking guide of the respective base station 22 or hive dock 24. In any embodiment, the visual, image or video sensor 104 of the UAV transport can be utilized to read guidance aids 51 on base station 23, guidance aids 160 on a hive dock 24, a visual QR or scan code provided on the base station, a hive dock or both, for example to identify the station 22 or dock 24, to facilitate docking of the UAV with the station or dock both or any other purpose. Such visual QR code or scan code can include, for example, guidance aids 51 of the base station 22. The controller 74 of the UAV transport 31, with the assistance of the visual or other guidance sensor 104 of the transport, can differentiate without human intervention or control between a plurality of docking stations located near each other, for example a plurality of base station docks 23 or hive docks 24, and automatically direct the UAV transport to dock with a pre-specified one of the plurality of docking stations.

In any embodiment, any or all aspects of the payload system or assembly 96 and of the docking guidance mechanism 103 of the UAV transport 31 can be coupled to and controlled by controller 74 of the UAV transport. In any embodiment, the payload system and the docking guidance mechanism can be fully automated, and thus do not require human intervention or control during respective operation.

Figure 4:
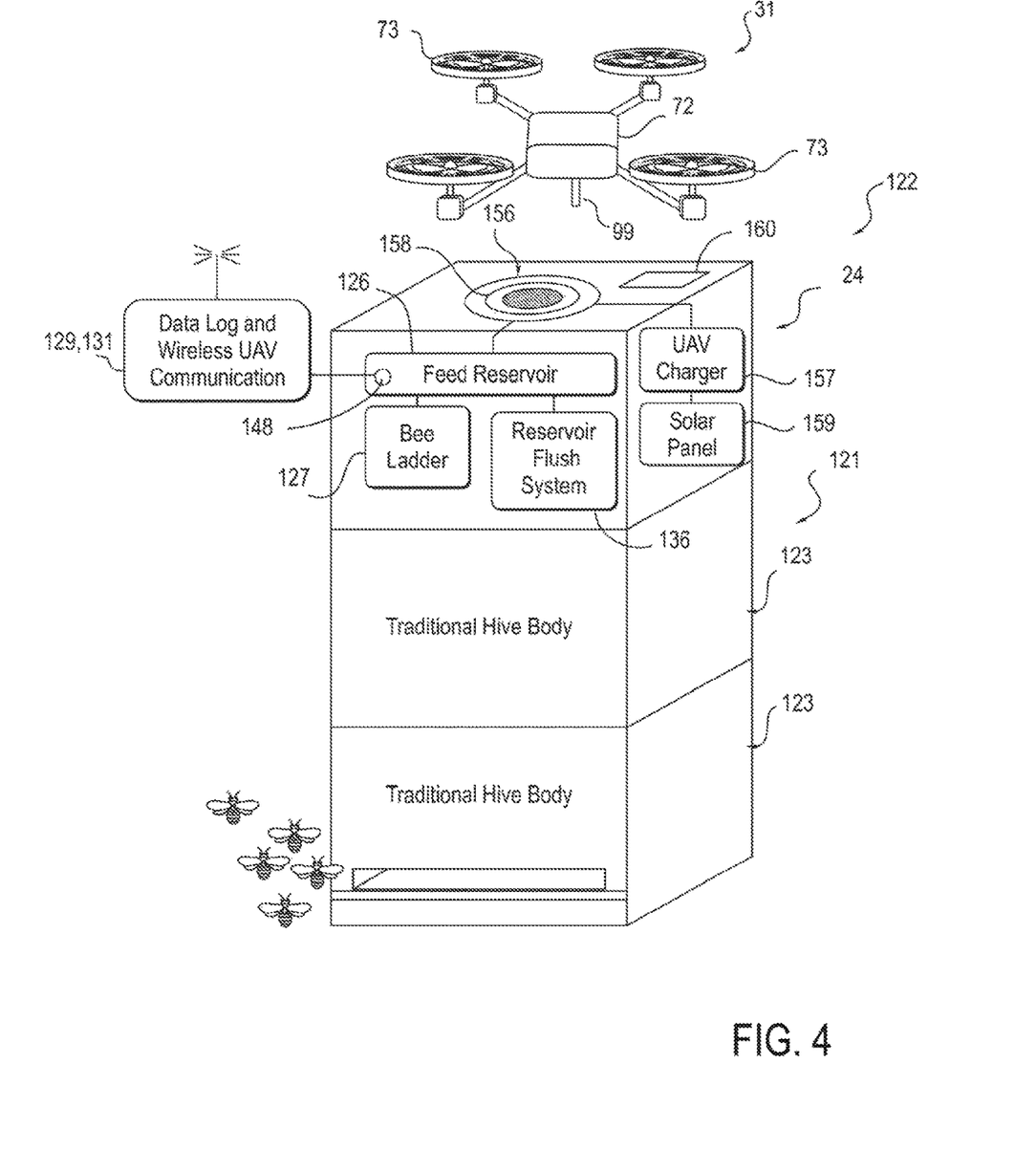
FIG. 4 is a schematic drawing of one embodiment of a recipient station of the system of FIG. 1.

A suitable docking mechanism 24, which can be referred to as a hive dock or docking receiver, can be fitted to each beehive 121 to be serviced by the UAV transport 31, for example as illustrated in FIG. 4. The combined docking mechanism 24 and beehive 121 can be referred to as an assembly or apparatus 122, such as a beehive assembly, a hive assembly, a hive feeding assembly, a beehive apparatus or any combination of the foregoing. The hive 121 can be a traditional hive having a hive body 123 for housing a beehive and the honey made by the bees housed in the hive. In any embodiment, the hive dock 24 can be carried by the hive body 123, for example by being joined to the top of the hive body. In any embodiment, the hive dock 24 can sit on top of the traditional hive 121 like a traditional top feeder. The hive dock 24 provides the capability for the UAV transport 31 to deliver its payload to the hive 121.

In any embodiment, the hive dock 24 can include a reservoir or container 126 for receiving feed from the UAV transport 31. The reservoir or container 126 can be of any suitable type and in any embodiment can be an open-top container, for example a tray, a bottle, a tank, ajar or any combination of the foregoing. A bee ladder or other suitable access device or mechanism 127 can be included in the hive dock 24 for permitting the bees in the hive to access the feed in the feed reservoir 126. An optional sensor 148 can be provided in the hive dock 24 for monitoring the level or amount of feed in the feed reservoir, and the hive dock can include a wireless transmitter 129, and in any embodiment a receiver, for transmitting and receiving information from the UAV transport 31, the base station 22 and any other component of the system 21. Such transmitted information can include the sensed levels in feed reservoir 126. A data log 131 can also be maintained, at the hive dock 24 or elsewhere in the system, for recording the amount of feed in feed reservoir 126, including as a function of time. The data log 131 can be of any suitable type, for example computer memory or other storage. For simplicity, transmitter and receiver 129 and data log 131 are shown together in FIG. 4. Data in log 131, for example obtained from sensor 148, can be used to adjust delivery amounts of feed, medicaments, other liquids or any combination of the foregoing to the reservoir or container 126 from the UAV transport 31.

In any embodiment, a reservoir flushing device, assembly, mechanism or system 136 can optionally be provided in the hive dock 24. The flushing system 136 can be of any suitable type, for example to remove old or possibly spoiled feed before delivery of fresh feed to the feed reservoir 126. The optional flushing system 136 can be provided independent of data log 131, for example used with or without the data log 131. Thus, for example, flushing system 136 could be deleted from the embodiment illustrated in FIG. 4. In any embodiment, the optional flushing device or system 136 can include a valve or other controlled release mechanism 137 that is fluidly coupled to the feed reservoir 126 and drains unused feed from the feed reservoir, for example from the bottom of the reservoir. The controlled release mechanism 137 can be of any suitable type, and in any embodiment can be an electrically-operated valve. In any embodiment, the optional flushing device or system 136 can include any suitable pump, valve, cleaning supply port or other controlled fluid delivery mechanism 138 for delivering pressurized liquid to jets or nozzles 139 for washing the feed reservoir 126, which can be drained by the valve or other controlled release mechanism 137. The liquid supplied to delivery mechanism 138 and jets 139 can be supplied from any suitable onsite or other supply source. For example, in any embodiment, the UAV transports 31 can distribute cleaning solution or water, to delivery mechanism 138 or elsewhere on top feeder 141, for more thorough cleaning of the feed reservoir 126.

Figure 5:
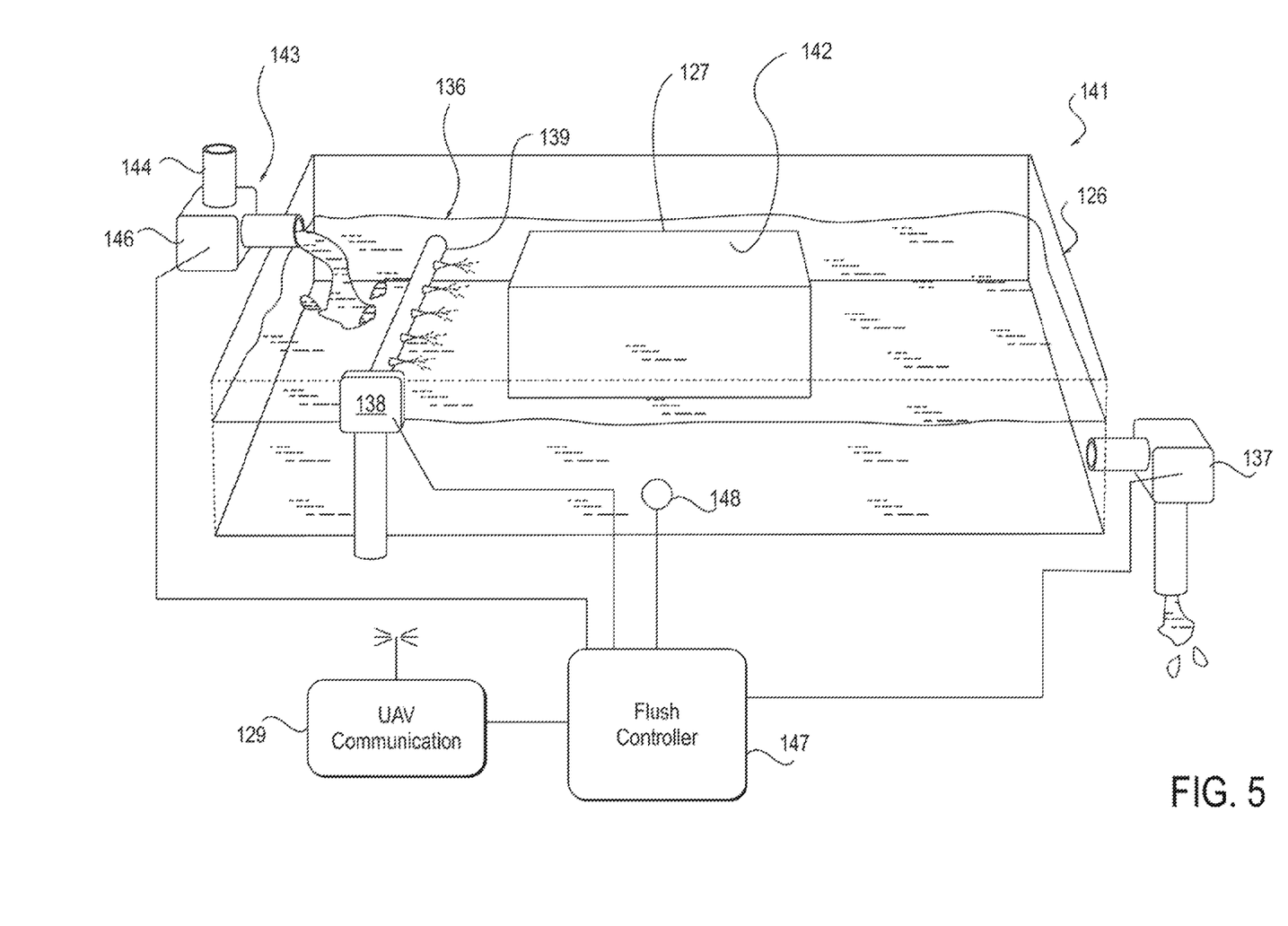
FIG. 5 is a schematic drawing of one embodiment of a self-flushing hive top feeder of the recipient station of FIG. 4.

One embodiment of a top feeder 141 for a beehive 121 is illustrated in FIG. 5. A top feeder or reservoir is provided, for example to sit atop a beehive 121. The top feeder can include any suitable container or reservoir 126, for example an open-top container, for holding feed, other liquids and any other materials to be consumed by the bees of the hive 121. A bee ladder 127 can be provided for permitting bees from the hive to access the reservoir or container 126 and the contents therein. The bee ladder 127 can include a port or opening 142 that opens near the container, in the vicinity of the container or in the container, for example as shown in FIG. 5. The feeder 141 can include a fill port or fill port device 143 of any suitable type for delivering feed and other liquids from a UAV transport 31 or elsewhere to the reservoir or container 126 of the feeder. For example, a tubular assembly or tube 144 can have an entrance at the docking port of the hive dock 24 for receiving feed or other liquids from the UAV transport 31, such as the nozzle assembly 99 of the UAV transport, and transporting them to the fill port 143 of the top feeder 141 for supplying the reservoir or container 126 of the top feeder. In any embodiment, the fill port 143 can include a valve for regulating the flow of feed or other liquids into the container of the feeder. The valve or controlled delivery mechanism 146 can be of any suitable type, and in any embodiment such mechanism can be an electrically-operated valve.

The feeder 141 can optionally be a self-flushing feeder and include flushing device or system 136, including for example controlled release mechanism 137, controlled delivery mechanism 138 and jets 139. Feeder 141 can further include a controller 147 of any suitable type for controlling any or all aspects of the feeder, including some or all aspects of flushing device or system 136. The controller, which can be referred to as a flush or feed controller 147, can for example include a computer having a microprocessor, memory or other suitable storage, a battery and a user interface. The controller can be electrically coupled or connected to the fill port 143 for controlling and powering the operation of such port and any components thereof. The controller 147 can be electrically coupled or connected to controlled release mechanism 137, controlled delivery mechanism 138 or both for controlling and powering the operation of such mechanisms and any components thereof.

In any embodiment, sensor 148, or another suitable liquid or other sensor, can be provided with the container or reservoir 126 of the top feeder 141 for monitoring and reading the amount or level of liquid in the reservoir. The sensor 148 can be electrically coupled or connected to the feed controller 147 for communicating the sensed information to the controller. In any embodiment, the feed controller 147 can regulate the operation of the fill port valve or other controlled delivery mechanism 146, for example as a function of the sensed information, to maintain a certain amount or level of the desired liquid within the container 126 or open the fill port valve 146 when the liquid within the container reaches a certain level. The controller 147 can communicate with the UAV transport 31, the base station 22 or both by any suitable means, for example by any of the data transfer mechanisms discussed herein. For example, a transmitter and receiver 129 can be provided for permitting wireless communications with the feed controller 147. In any embodiment the feed controller can communicate directly with the UAV transport 31, for example by a hard wire connection, by means of any suitable communication or signal adapters, including those disclosed herein, carried by the UAV transport 31 and the docking port 24 of the beehive assembly 122.

The feeder 141 can include components for removing old feed or other liquids from the reservoir or container 126 of the feeder and optionally rinsing or cleaning the inside of the container before new feed or other liquid is supplied to the container. In any embodiment, drain component or element 137 can be provided, for example a valve or other controlled release mechanism for controllably draining the container 126. The drain component 137 can be of any suitable type, for example an electrically-operated valve that is electrically coupled to the feed or flush controller 147 and thus operated by such controller. The optional flushing components of the feeder can include the fill port 143 of the feeder 141 that can deliver cleaning solution to the container 126 to enhance the removal of old feed or other liquids from the container and the cleaning of the container. In any embodiment, the cleaning solution can be supplied to the feeder 141 from a UAV transport 31, for example in the manner that feed is supplied to the feeder from a UAV transport. For example, the cleaning solution can be provided to fill port 143 through fill port tube 144. The cleaning solution and feed, with or without medication, can be supplied by the same UAV transport or by different UAV transports. In any embodiment, the cleaning solution can be provided by a source other than a UAV transport 31, for example a pressurized tank or container (not shown) that is located local to or remote of the hive and that can supply one or more hives. In any embodiment, cleaning fluid can be water from a site supplied source such as a municipal tap. Such source can be fluidly coupled to controlled delivery mechanism 138, fill port 143 or any combination of the foregoing. In any embodiment, the supply of such cleaning solution to the container 126 can be regulated by the electrically-operated fill port valve or other controlled delivery mechanism 138 or 146 or both, and controlled by the feed controller 147 or any other controller of the system. The pressurized tank or container of cleaning solution can include an electrically-operated pump (not shown) that is coupled to the respective controller, for example controller 147, and a pressure or other sensor (not shown) for maintaining or controlling the pressure of the liquid in such tank.

In any embodiment, the optional flushing components can include one or more jets or nozzles 139 for cleaning the container 126, for example in connection with the draining of the container and before the resupplying of the container. The one or more nozzles or jets can be coupled to any suitable liquid source, for example the fill port 143 of the top feeder 141. In any embodiment, the one or more nozzles 139 can be coupled to a pressurized liquid supply (not shown) that is separate and distinct of the fill port 143, including any pressurized or other supply source coupled to the fill port 143. Such pressurized liquid supply can be of any suitable type, such as a pressurized water container that can be coupled to the one or more nozzles 139 by a valve or other controlled delivery mechanism, for example controlled delivery mechanism 138. In any embodiment, the pressurized water container can be located local to or remote of the hive assembly 122 and can supply one or more hives. In any embodiment, such valve or other controlled delivery mechanism can be an electrically-operated valve that is electrically coupled to and controlled by controller 147 of the top feeder 141 or any other controller of the system 21. The pressurized water or other liquid supply can include an electrically-operated pump (not shown) that is coupled to the respective controller and a pressure or other sensor (not shown) for maintaining or controlling the pressure of the liquid in such supply.

In any method of operation of the flushing top feeder 141 of the invention, controller 147 of the top feeder can be programmed, for example by software, firmware or a combination thereof, to selectively control the operation of the various electrical components of the top feeder, including for example mechanisms 143, 138 and 137, for example as a function of the information received by the controller from the liquid level or other sensor 148 of the feeder 141. For example, the controller 147 can monitor the level of the liquid in the reservoir or container 126 of the top feeder, periodically or continuously, and drain or empty the liquid therein immediately or at some point in the future, for example after the liquid in the container drops to a certain level, after the feed shelf life has expired or any combination of the foregoing. Such draining of the reservoir or container 126 can be by any suitable means, for example including controlled release mechanism or valve 137. The controller 147 can then optionally command the electrically-operated valve 146 of the fill port 143, the electrically-operated valve 138 of the cleaning nozzles 139 or both to commence cleaning of the container 126. The cleaning of the container 126 can be timed with the delivery of cleaning solution to the feeder 141 by a UAV transport 31. Following draining, and optional cleaning, of the container 126, the controller 147 can signal the resupplying of the container with feed or other liquid. Such filling of the container 126 can include the delivery of new feed or other liquid to the docking port or hive dock 24 of the hive assembly 122 and the top feeder 141 by a UAV transport 31, with such feed or other liquid being supplied to the container by the fill port 143. Other methods of operating the flushing top feeder 141 can be provided. For example, in any method the commands of the feed controller 147 to drain the container 126, to optionally flush or clean the container and to resupply the container can be carried by the UAV transport 31 and relayed to the controller 147 either wirelessly or as part of the dock sequence of the UAV transport 31 with the hive dock 24. In any embodiment, feeder 141, flushing device or system 136, any aspects of either thereof or both can be operated by a controller other than controller 147, for example a controller remote of the feeder 141 such as controller 61, controller 74, another controller of system 21 or any combination of the foregoing. Such other controller or controllers can communicate with feeder 141 and flushing device or system 136 through communication link 129 or any other suitable means.

The hive dock 24 can be of any suitable type and can include a docking port 156, for example on the top thereof, for receiving the UAV transport 31 and permitting the UAV transport to deliver feed to the feed reservoir 126. In any embodiment, the docking nozzle 99 of the UAV transport 31 can be received by the docking port 156 and extends through the docking port upon landing of the UAV transport on the docking port such that, for example, the exit opening 100 of the nozzle 99 is above the feed reservoir 126 inside the hive dock 24. In this manner, feed from the UAV transport 31, for example feed or payload tank 97, can be fed via gravity from the transport to the feed reservoir 126. In any embodiment, a pump, valve or other suitable controlled delivery mechanism, or any number thereof, for example controlled delivery mechanism 98, can be provided for delivering feed from the UAV transport 31 to the feed reservoir 126 in the hive dock 24. In any embodiment, the hive dock 24 can optionally be provided with a suitable UAV charger 157 for charging of the UAV transport 31, for example to recharge the battery of the UAV transport so as to extend the range of the UAV transport. The charger 157 can cooperatively couple to the UAV for charging by any suitable means, for example by means of any suitable charging adapter 158. A suitable power source can be included in the hive dock 24 for powering the UAV charger 157 and any components of the hive dock requiring electrical energy. The power source can be a renewal power source, such as a solar panel or cell 159 or a wind-powered electrical generator (not shown). In any embodiment, the hive dock 24 can be provided with suitable guidance aids 160 for facilitating the docking of a UAV transport 31 with the docking port 156. In any embodiment, the hive dock 24 can include any suitable visual QR or scan code to facilitate aerial or field identification of the hive dock, for example by a UAV transport 31, and docking of the UAV transport with the hive dock 24.

The docking system 171 between the UAV transport 31 and the base station dock 23 or the hive dock 24 can be of any suitable type, and can include a first docking portion 172 on the UAV transport and a complementary second docking portion 173 on the respective dock (see FIG. 6). In any embodiment, the first docking portion 172 can include delivery nozzle 99 of the UAV transport 31. In any embodiment, as illustrated for example in FIG. 6, the payload system 96 of the UAV transport 31 can include the nozzle assembly or nozzle 99 for supplying feed to the UAV transport and delivering feed from the UAV transport, the payload tank 97 for holding the liquid feed during transport, the pump, valve or other controlled delivery mechanism 98 for controlling flow between the nozzle and the payload tank and the docking guidance mechanism 103 for assisting in docking of the UAV transport 31 with the respective dock 23, 24. The payload tank can be referred to as a feed tank 97. The payload system 96 can be carried by, or be part of, the body 72 of the UAV transport 31. The nozzle assembly 99, which can be referred to as the delivery nozzle, can be of any suitable type. In any embodiment, the nozzle assembly 99 can include a tubular member or elongate tube 176 that is fluidly connected to the controlled fluid delivery mechanism 98 and has a free end 177 that is received by the respective dock. In any embodiment, the nozzle 99 can include a position compensator or docking adjustment assembly 178 for facilitating seating of the nozzle in the respective dock. The position compensator 178 can be of any suitable type and can be located anywhere on the nozzle, for example at the end of the nozzle that is joined to the body 72 of the UAV transport 31. The position compensator 178 can provide vertical adjustment, horizontal adjustment or both to the free end 177 of the nozzle relative to the body 72 of the UAV transport 31. Such vertical adjustment can be referred to as vertical positional seating compensation and such horizontal adjustment can be referred to as horizontal positional seating compensation. In any embodiment, the position compensator can be a spring-loaded compression joint 178. In any embodiment, the UAV payload system 96 can include a charge adapter that can be utilized to charge the batteries of the UAV transport. The charge adapter can be of any suitable type, for example charge adapter 101, for engaging a cooperative mechanism of the respective dock. In any embodiment for example, charge adapter 101 of the payload system 96 can be carried by the nozzle assembly 99, for example around at least a portion of the free end 177 of the nozzle. In any embodiment, the UAV payload system 96 can include a data transfer mechanism (not shown) for interacting with a data transfer and interface mechanism (not shown) of the docking port. Such data transfer mechanism can be of any suitable type, for example of the type known in the art. For example, where such data transfer is accomplished by hard wire, the nozzle assembly 99 of the UAV transport can include such a data transfer mechanism for cooperating with the data transfer and interface mechanism of the docking port. In any embodiment, data transfer can be accomplished wirelessly, for example by radio frequency, infrared or any other suitable means. The UAV transport 31, and the payload system 96 thereof, can include a suitable docking seal 181 around the free end of the nozzle for contributing to a fluid tight seal around the nozzle assembly 99 and the respective dock 23, 24 during movement of feed between the nozzle and the dock. The docking seal 181 can be made from any suitable material, such rubber or another elastomeric material.

The second docking portion 173, for example the docking port 34 of the base station dock 23 or the docking port 156 of the hive dock 24, can be of any suitable type. In any embodiment, as illustrated for example in FIG. 6, the second docking portion 173 can include a docking guide 186 for guiding the delivery nozzle system 99 of UAV transport 31 relative to the opening 189 of the respective docking port 34, 156 during a docking procedure. For example, the docking guide 186 can guide the nozzle assembly 99 of the UAV transport 31 into an engaged position with respect to the opening 189 of the docking port. In any embodiment, the docking guide 186 can include a truncated cone-shaped or other guide surface 187 extending from an upper surface 188 of the respective dock and having an opening 189 at the bottom for receiving the free end 177 of the UAV nozzle 99. The guide surface 187 can be formed from any suitable material, such as a solid material, a rigid material, rails or other guide elements. The guide surface 187 can form a recess 191 in the upper surface of the dock, into which the nozzle 99 extends and is guided by the guide surface. The guide surface can be referred to as a nozzle receiver 187. The docking port 42, 156 may include a door or other closure device (not shown) for inhibiting debris or other contaminants from entering the nozzle receiver 187.

In any embodiment, a tubular member or passageway 192 can extend from the bottom of the docking guide 186 to the reservoir of tank of the respective dock 23, 24, which can include the feed supply tank or container 35 of the base station 22 and the feed reservoir 126 of the hive dock 24. The tubular member or passageway 192 can be sized and shaped larger than the free end 177 of the nozzle 99 for receiving at least a portion of the free end of the nozzle when the UAV transport 31 is docked with the respective dock. A suitable docking seal or seat 193 can be provided, for example at the bottom of the docking guide 186 above the tubular member or passageway 192, for sealably engaging the docking seal 181 of the nozzle 99 upon docking of the UAV transport 31 with the respective dock. The docking seal 193 can inhibit leakage during feed transfer. In any embodiment, the docking seal 193 can include a door or other closure device 194 to prevent contamination of the feed in the respective dock from the external environment. Such door 194 can be automatically sealable when a UAV transport 31 is not docked with the respective dock 23, 24. In any embodiment, a pump, valve or other suitable controlled delivery mechanism 196, or any number thereof, can be provided in the second docking portion 173 of the respective dock for delivering feed from the feed supply tank 35 to the UAV transport 31 or from the UAV transport to the hive feed reservoir 126. For example, such controlled delivery mechanism 196 can include the one or more controlled delivery mechanisms 38 of the base station 22. Such a pump, valve or other suitable controlled delivery mechanism 196 may not be needed in the second docking portion 173 in certain embodiments, for example in a docking port 156 of a hive dock 24 where feed may be deliverable to the feed reservoir 126 of the hive dock by gravity or for example when the payload system 96 of the UAV transport 31 includes pump, valve or other controlled delivery mechanism 98 for supplying feed to the transport, delivering feed from the transport or both.

In any embodiment, the second docking portion 173 can include a UAV charger for charging the batteries of the UAV transport 31 while it is docked with the dock. Such UAV charger, which for example can include a charger 41 of the base station 22 and a charger 157 of a hive dock 24, can cooperate with the UAV charge adapter 101 of the UAV transport 31 in this regard. In any embodiment, a charging element or adapter can be electrically coupled or connected to the UAV charger of the dock and have a portion that extends into the docking guide recess 191 for electrically communicating or engaging the UAV charge adapter 101. The charging element or adapter of the second docking portion can include, for example, charging adapter 42 of the base station 22 and charging adapter 158 of a hive dock 24. In any embodiment, the charging element or adapter of the second docking portion 173 can utilize electrical contacts or induction to electrically communicate with the UAV charge adapter 101.

In any embodiment, the second docking portion 173 of the docking system 171 can be provided with suitable guidance aids, including for example machine readable markings, for facilitating identification of the second docking portion, the maneuvering or docking of a UAV transport 31 with the second docking portion or both. In any embodiment, the second docking portion 173 can include any suitable docking guidance visual aid, which can include a visual QR or scan code. Such guidance aids can include, for example, guidance aids 51 of the base station 22 and guidance aids 160 of a hive dock 24. The guidance aids can be on a top or upper surface 188 of the second docking portion, for example in the vicinity of or adjacent the docking guide 186 of the docking portion as illustrated in FIG. 6.

In any embodiment, the UAV transport 31 can include a GPS receiver, for example GPS receiver 78, and a camera, image, video or other sensor with for example visual capability, for example guidance sensor 104, to seamlessly transition from coarse to detailed precision navigation. In one docking sequence of the invention, the UAV transport 31 can hover to a predetermined height, at which point GPS navigation can cause the UAV transport to move to and hover over the inputted location of the target. The delivery controller 74 of the UAV transport 31 can use information from the docking guidance mechanism 103 of the UAV transport to visually identify the target, for example from multiple targets grouped close to each other such as within a few feet of each other, adjust the position of the UAV transport over the desired target, use visual guidance patterns on the dock or docking portion of the target to align the nozzle 99 of the UAV transport 31 above the desired target, and descend onto the second docking portion 173, for example docking port 34 of the base station dock 23 or docking port 156 of a hive dock 24, of the target until the nozzle of the UAV transport seats within the docking guide 186 of the port. In any embodiment, the charge adapter of the docking port, for example charging adapter 42 of the base station 22 and charging adapter 158 of a hive dock 24, can be used to signal positive seating of the nozzle 99 of the UAV transport 31 within the docking guide 186 of the port.

Various methods can be provided for implementing the flow of liquid from a dock, for example a base station dock 23 or a hive dock 24, to a UAV transport 31. Pumps may be provided on the base station dock, the hive dock, the UAV transport or none of the above. For example, in any embodiment if feed supplied from the base station 22, for example in the feed supply tank 35 of the base station, were under pressure, feed could be transferred to the UAV transport by means of an automated valve on the respective docking port, for example on docking port 34, and a check valve on the UAV transport 31. Such automated valve on docking port 34 could include, for example, one or more controlled delivery mechanisms 38 and such check valve on the transport 31 could include, for example, controlled delivery mechanism 98. In any embodiment, the UAV transport 31 can deliver feed using gravity with an automated valve or mechanism 38. Nonetheless, there may be advantages to including a pump or mechanism 98 on the UAV 31. For example, with a pump or controlled delivery mechanism and a meter, the UAV transport may be able to dispense more accurate feed amounts to hives, which can be important in more sophisticated scheduling algorithms, especially those involving a UAV transport delivering to multiple target destinations before returning to its base.

Although the system of the invention can be operated in any suitable manner, any method of operating the automatic system of the invention with respect to a UAV transport 31 can be as follows.

Figure 7:
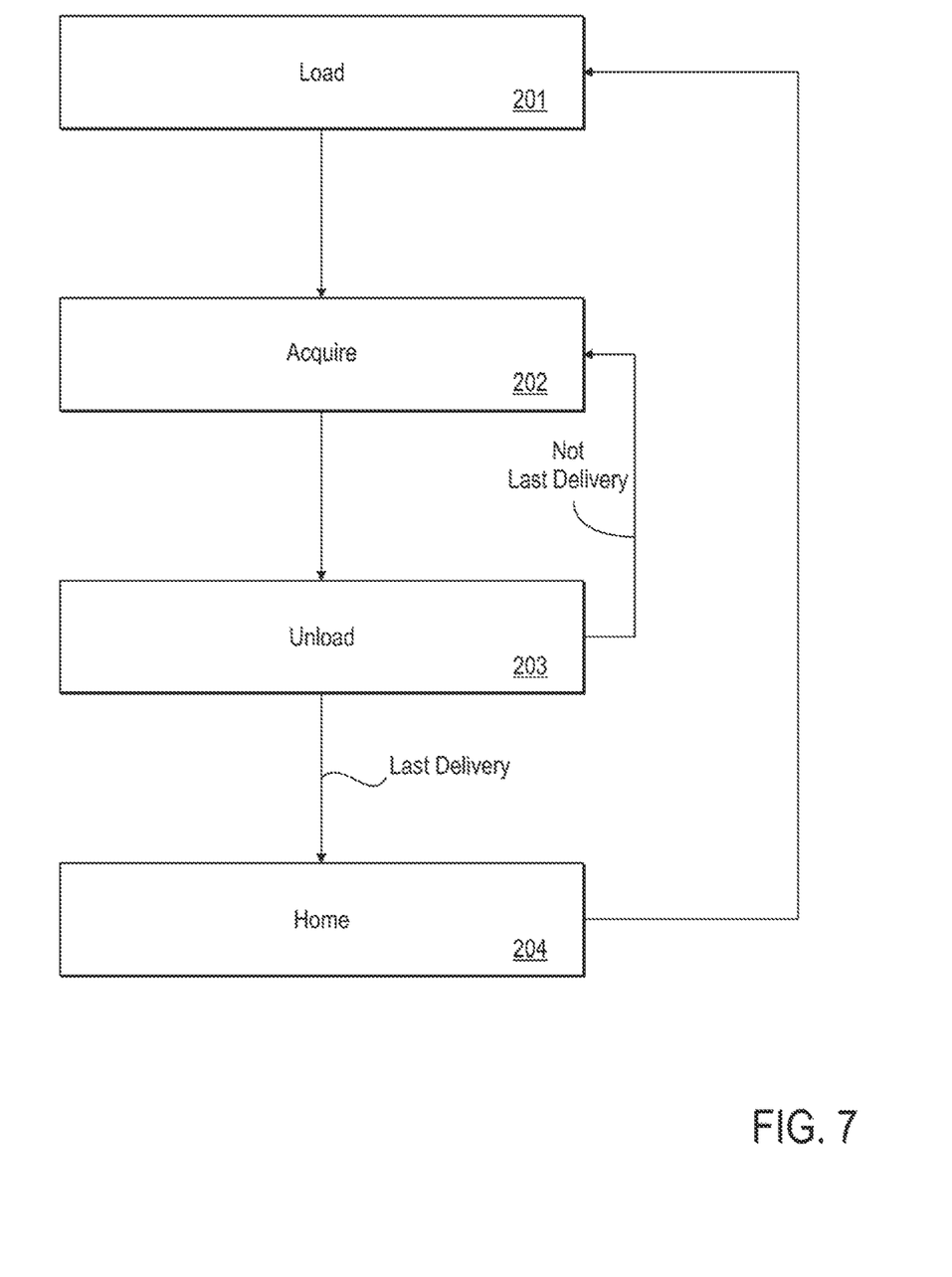
FIG. 7 is a schematic drawing of one embodiment of the control instructions for the unmanned aerial vehicle of the system of FIG. 1.

1. The scheduler 63 can be programmed for automatic operation and with hive requirements for feed and medicine, for example as disclosed herein, by the beekeeper 66 or both. The scheduler can initiate payload preparation for one or more UAV transports 31, either automatically or on command, which can include preparation of the feed sufficient for the deliveries of the one or more UAV transports.
2. As for example illustrated in load step 201 of FIG. 7, a UAV transport 31 can automatically dock with the base station 22, which can be referred to as a first station. In any embodiment, the batteries of the transport 31 can be charged while docked at the base station. Computer instructions that include the location of a second station and the amount of the liquid to be delivered to the second station from the first station can be delivered to the UAV transport 31 while the UAV transport is docked at the base station 22. For example, a delivery log data and one or more target hives can be wirelessly or electrically delivered by the controller 61 or scheduler 63 to the UAV transport 31. The controller or scheduler can instruct the base station 22 to automatically fill the UAV transport with the appropriate amount of feed, for example at least enough feed to accomplish the instructed deliveries of the UAV transport. Such feed can be provided, for example, by supply tank 35.
3. As for example illustrated in acquire step 202 in FIG. 7, the UAV transport 31 can travel automatically to the vicinity of a first scheduled destination or target, for example a hive dock 24. The destination or target can be referred to as a second station.
4. As for example illustrated in unload step 203 in FIG. 7, the UAV transport 31 can automatically dock with the target hive dock 24, automatically deliver the directed payload to the hive dock and receive hive specific data from the hive dock. The directed payload can be a portion of the liquid carried by the UAV transport 31 or the entire payload. In any embodiment, the UAV 31 can optionally initiate an automatic flush of the feed reservoir 126 of the hive dock 24 before the feed reservoir is automatically replenished with feed or other liquid from the UAV transport. The UAV transport 31 can undock from the second station, fly to the vicinity of a third station, dock with the third station and deliver at least a portion of the remaining liquid from the UAV transport 31 to the third station. For example, a UAV transport 31 can travel and dock with a plurality of hive docks 24 before automatically returning to the base station 22 or otherwise completing its mission. If in this regard a further delivery is required, the UAV transport can automatically undock and travel to the next target hive dock 24, for example by repeating the acquire step 202 in FIG. 7.
5. As for example illustrated in home step 204 in FIG. 7, the UAV transport 31 can repeat the acquire and unload steps in FIG. 7 until its entire payload has been delivered, its payload storage container is empty or it has completed its delivery schedule. Thereafter, the UAV transport 31 can then return to the base station 22, for example for another mission. For example, the UAV transport 31 can undock from a third station, fly to the vicinity of the first or base station 22, dock with the first station and be supplied with additional liquid from the first or base station 22.

Any number of UAV transports 31 can operate in the foregoing manner, for example sequentially or simultaneously. Any of the steps of the UAV can be performed without human intervention, for example autonomously, or semi autonomously.

In one aspect of the invention, a method for transporting a liquid from a first station to a second station with a UAV transport is provided and can include docking the UAV transport with the first station, supplying the UAV transport with liquid from the first station, undocking the UAV transport from the first station, flying the UAV transport to the vicinity of the second station, docking the UAV transport with the second station and delivering at least a portion of the liquid from the UAV transport to the second station. The method can further include delivering computer instructions that include the location of the second station and the amount of the liquid to be delivered to the second station from the first station to the UAV transport while the UAV transport is docked at the first station. The method can further include undocking the UAV transport from the second station, flying the UAV transport to the vicinity of a third station, docking the UAV transport with the third station and delivering at least a portion of the liquid from the UAV transport to the third station. The method can further include undocking the UAV transport from the third station, flying the UAV transport to the vicinity of the first station, docking the UAV transport with the first station and supplying the UAV transport with additional liquid from the first station. The step of supplying the UAV transport with additional liquid can include supplying the UAV transport with additional liquid without human intervention. The second station can be a beehive and the liquid can include feed for the bees of the beehive. The liquid can include medication for bees. The flying step can include flying the UAV transport without human intervention during flight. The UAV transport can utilize a GPS device for navigation. The flying step can include flying the UAV transport to the vicinity of the second station and automatically differentiating the second station from a plurality of co-located stations. The docking step can include docking the UAV transport with the second station without human intervention. The delivering step can include delivering at least a portion of the liquid from the UAV transport to the second station without human intervention.

In one aspect of the invention, a UAV transport for delivering a liquid from a first station to a second station is provided and can include a body, a plurality of motorized rotors carried by the body for providing lift to the body, a reservoir carried by the body for carrying the liquid and at least one port coupled with the reservoir for supplying the liquid from the first station to the reservoir and for delivering liquid from the reservoir to the second station.

The at least one port can include a nozzle. The UAV can further include a battery carried by the body for providing electrical power to the plurality of motorized rotors and an electrical contact carried by the nozzle and electrically coupled to the battery, wherein the electrical contact permits an electrical connection with the base station for charging the battery while the UAV transport is docked at the base station. The UAV transport can further include a pump coupled between the reservoir and the at least one port. The UAV transport can further include a processor carried by the body for controlling operations of the UAV transport and a computer memory carried by the body for storing instructions received from the first station for delivering at least a portion of the liquid to the second station and electrically coupled to the processor for providing such instructions to the processor. The second station can be a beehive and the liquid can include feed for the bees of the beehive.

In one aspect of the invention, a method for maintaining a feed tray having a bottom of a beehive is provided and can include draining the existing feed from a port in the bottom of the feed tray and adding new feed to the tray.

The method can further include rinsing the feed tray with a liquid and draining the rinsing liquid from the port. The port can include an electrically-actuated valve. The adding step can include adding new feed to the tray with a UAV transport. The instructions for commencing the draining step can be carried by the UAV transport.

In one aspect of the invention, a top feeder for use with liquid feed to nourish the bees of a beehive is provided and can include a container adapted to receive the liquid feed, the container having an open top and a bottom, a valve provided in the bottom of the container for permitting liquid feed to be drained from the container before new liquid feed is added to the container.

The top feeder can further include a mechanism coupled to the valve for permitting remote operation of the valve. The valve can be an electrically-operable valve. The top feeder can further include at least one liquid nozzle for washing the container with a liquid. The at least one liquid nozzle can be a plurality of liquid nozzles for washing the container with a liquid. The top feeder can further include a pump for supplying a pressurized liquid to the at least one liquid nozzle. The top feeder can further include a reservoir for the liquid supplied to the least one nozzle. The container can be a tray.

The system and method of the invention can automate the distribution of liquid feed and medicated feed to any number of hives in a given area, and can permit beekeepers to manage larger numbers of hives more intensively with less labor. The system and method of the invention can result in healthier bees and a lower annual hive loss rate and thus increase the economics of a beekeeping practice.

Although the method and system of the invention have been described as one or more UAV transports for delivering a liquid or other flowable payload to one or more beehives, in any embodiment the method and system of the invention can be utilized for delivering any payload to one or more beehives by means of one or more suitable UAV transports. In any embodiment, the method and system of the invention can be utilized for delivering a liquid or other flowable payload to one or more suitable targets by means of one or more suitable UAV transports.

Although the method and system of the invention are automatic, in any embodiment human or manual intervention is permitted and can be optionally provided at any step.

Advantages of the system, transport and method of the invention are many. Appropriate feed amount can be a factor of individual hive strength. With logging data accumulated by the system of the invention, it is possible to predict future feed requirements of each hive individually, then dispense individually appropriate amounts to the various hives in a single trip from the base station. If the capacity of the feed tank of the UAV transport is large enough, this can be very important. With smaller payload capability, it may take multiple trips to a single hive to fill the feed reservoir of the hive. It is also possible to estimate hive strength using logged data of the amount of feed taken or consumed by the bees.

The system of the invention can operate periodically, for example every day, for a significant length of time, for example weeks, without human intervention before signaling that action to maintain the system is required. Such action, for example, could be replenishing low ingredient levels in the feed tank, mixer or hopper.

Flushing of the feed reservoir at the hive can be advantageous because if a weak hive cannot take all the food, the existing food may ferment. If one adds fresh feed to bad feed, the feed can go bad quicker.

The inventor has been keeping honeybees for nearly a decade. Some time ago, he began recording data, diagnoses of problems and applications of treatments. Through a combination of field and laboratory analysis, he began to record the problems that were most prevalent in lost hives. The results of his data collection and treatment applications seem to point to three major issues that can affect the health of the honeybee hives, namely *Varroa, nosema* and food supply. The inventor has found that changes in cultivation technique that have focused on aggressive *Varroa* and *nosema* control, and management of food supplies during dearth periods, have yielded significant improvements.

Distribution of liquid feed is an important component in managing hives. It has been found that hives consume considerable material that should advantageously be distributed to each hive individually. The feed should preferably be distributed frequently. About once a week may be the longest interval that can be scheduled. Any longer, and the syrup frequently ferments and may no longer be taken. Further, it may be difficult to premix syrup for the same reason. If longer, the syrup may ferment or mold may develop inside the containers without additional additives to prevent it.

*Nosema* medication can be distributed through food (syrup) and therefore it has been found that the method of *nosema* distribution can be the same as the distribution of feed alone. *Nosema* medication is perishable once mixed, and should preferably be distributed the same day. Further, *nosema* medication can be expensive, and therefore it can be desirable to treat only as necessary, which can increase the complexity of field distribution as it has been found that each hive should be accounted and proper feed or medication dispensed into the correct hive. *Nosema* medication distributions can be scheduled prophylactically, or to all hives when symptoms are observed.

While *Varroa* control is important to maintaining the health of beehives, current methods for distributing medication for *Varroa* control are significantly different from *nosema* and food distribution. However, the inventor has observed that research in new methods of *Varroa* control, such as RNA interference, depend on timely feed distribution with similar problems of spoilage. Therefore, that inventor believes that future *Varroa* treatments may also depend heavily of efficient feed and other liquid distribution.

While some beekeepers continue to experience high losses, even 80-100% is not uncommon, various apiaries managed by the inventor using the foregoing protocols have experienced considerably lower losses.

I claim:

1. A method for transporting a liquid from a first station to a second station with a UAV transport, comprising docking the UAV transport with the first station, supplying the UAV transport with liquid from the first station, undocking the UAV transport from the first station, flying the UAV transport to the vicinity of the second station, docking the UAV transport with the second station and delivering at least a portion of the liquid from the UAV transport to the second station, delivering computer instructions that include the location of the second station and the amount of the liquid to be delivered to the second station from the first station to the UAV transport, and docking the UAV transport comprises using a docking guidance mechanism comprising a visual sensor to read guidance aids on a base station or a hive dock to identify the station or the dock and to facilitate docking of the UAV with the station or dock; wherein, the UAV transport comprises,
- a reservoir and at least one port coupled with the reservoir for delivering liquid from the reservoir to the second station, the at least one port includes a nozzle, and
- a battery carried by a body of the UAV transport for providing electrical power to the plurality of motorized rotors and an electrical contact carried by the nozzle and electrically coupled to the battery, the electrical contact permits an electrical connection with the base station for charging the battery while the UAV transport is docked at the base station.

2. The method of claim 1, further comprising
delivering computer instructions that include the location of the second station and the amount of the liquid to be delivered to the second station from the first station to the UAV transport while the UAV transport is docked at the first station.

3. The method of claim 1, further comprising
undocking the UAV transport from the second station, flying the UAV transport to the vicinity of a third station,
docking the UAV transport with the third station and delivering at least a portion of the liquid from the UAV transport to the third station.

4. The method of claim 3, further comprising
undocking the UAV transport from the third station, flying the UAV transport to the vicinity of the first station,
docking the UAV transport with the first station and supplying the UAV transport with additional liquid from the first station.

5. The method of claim 4, wherein
the step of supplying the UAV transport with additional liquid include supplying the UAV transport with additional liquid without human intervention.

6. The method of claim 1, wherein
the liquid includes medication for bees.

7. The method of claim 1, wherein
the flying step includes flying the UAV transport without human intervention during flight.

8. The method of claim 7, wherein
the UAV transport utilizes a GPS device for navigation.

9. The method of claim 1, wherein
the flying step includes flying the UAV transport to the vicinity of the second station and automatically differentiating the second station from a plurality of co-located stations.

10. The method of claim 1, wherein
the step for docking the UAV transport with the second station includes docking the UAV transport with the second station without human intervention.

11. The method of claim 1,
wherein the delivering step includes delivering at least a portion of the liquid from the UAV transport to the second station without human intervention.

12. The method of claim 1, wherein
the second station is a beehive and the liquid includes feed for the bees of the beehive.

13. A UAV transport for delivering a liquid from a first station to a second station,
comprising a body,
a plurality of motorized rotors carried by the body for providing lift to the body,
a reservoir carried by the body for carrying the liquid and at least one port coupled with the reservoir for supplying the liquid from the first station to the reservoir and for delivering liquid from the reservoir to the second station,
the at least one port includes a nozzle, and
a battery carried by the body for providing electrical power to the plurality of motorized rotors and an electrical contact carried by the nozzle and electrically coupled to the battery, wherein the electrical contact permits an electrical connection with a base station for charging the battery while the UAV transport is docked at the base station.

14. The UAV transport of claim 13, further comprising
a pump coupled between the reservoir and the at least one port.

15. The UAV transport of claim 13, further comprising
a processor carried by the body for controlling operations of the UAV transport and a computer memory carried by the body for storing instructions received from the first station for delivering at least a portion of the liquid to the second station and electrically coupled to the processor for providing such instructions to the processor.

16. The UAV transport of claim 13, wherein
the second station is a beehive and the liquid includes feed for the bees of the beehive.

* * * * *